US006942488B2

(12) United States Patent
Slocum et al.

(10) Patent No.: US 6,942,488 B2
(45) Date of Patent: Sep. 13, 2005

(54) APPARATUS FOR DEMONSTRATING A SKELETAL SURGICAL TECHNIQUE

(75) Inventors: D. Barclay Slocum, deceased, late of Eugene, OR (US); by Theresa Slocum, legal representative, Eugene, OR (US)

(73) Assignee: D. Barclay Slocum Trust Agreement, Eugene, OR (US)

( * ) Notice: Subject to any disclaimer, the term of this patent is extended or adjusted under 35 U.S.C. 154(b) by 0 days.

(21) Appl. No.: 10/794,808

(22) Filed: Mar. 5, 2004

(65) Prior Publication Data

US 2005/0014114 A1 Jan. 20, 2005

Related U.S. Application Data

(63) Continuation of application No. 10/277,618, filed on Oct. 21, 2002, now abandoned, which is a continuation of application No. 09/773,432, filed on Jan. 31, 2001, now Pat. No. 6,468,087.
(60) Provisional application No. 60/179,354, filed on Jan. 31, 2000.

(51) Int. Cl.[7] ........................... G09B 23/28; G09B 23/36
(52) U.S. Cl. ...................... 434/267; 434/262; 434/274
(58) Field of Search ............................. 434/267, 274, 434/262, 275; 623/11.11, 27–56

(56) References Cited

U.S. PATENT DOCUMENTS 2,472,819 A * 6/1949 Giesen ...................... 434/274
3,779,654 A    12/1973 Horne
3,895,451 A     7/1975 Smrcka
4,350,490 A     9/1982 Sandegard
4,433,961 A     2/1984 Chandler
4,565,191 A     1/1986 Slocum
4,605,373 A     8/1986 Rosen
4,802,858 A     2/1989 Lindskog et al.
5,967,790 A *  10/1999 Strover et al. .............. 434/274
6,039,764 A     3/2000 Pottenger et al.
6,468,087 B2   10/2002 Slocum
6,695,619 B2 *  2/2004 Brown-Wilkinson ........ 434/274

* cited by examiner

*Primary Examiner*—Jessica Harrison
*Assistant Examiner*—Dmitry Suhol
(74) *Attorney, Agent, or Firm*—Kolisch Hartwell, P.C.

(57) ABSTRACT

An apparatus for modeling a skeletal structure before and after a surgical procedure is performed on the structure. The apparatus comprises a base, the base including a generally planar surface, at least one bone member coupled to the base, the bone member representing a bone involved in the surgical procedure, and at least one bone portion movably coupled to the bone member, the bone portion representing a part of the bone involved in the surgical procedure that is repositioned in the surgical procedure from a preoperative position to a postoperative position. The bone portion may be selectively moved between a preoperative position, representing the position of the part of the bone before the surgical procedure is performed, and a postoperative position, representing the position of the part of the bone after the surgical procedure is performed. The bone member may be coupled to the base generally parallel to the surface of the base.

1 Claim, 6 Drawing Sheets

TIBIAL PLATEAU LEVELING OSTEOTOMY

Fig. 6

APPARATUS FOR DEMONSTRATING A SKELETAL SURGICAL TECHNIQUE

CROSS-REFERENCE TO RELATED APPLICATIONS

This application is a continuation of U.S. patent application Ser. No. 10/277,618, filed Oct. 21, 2002 now abandoned and entitled "Apparatus for Demonstrating a Skeletal Surgical Technique" which is a continuation of U.S. patent application Ser. No. 09/773,432, filed Jan. 31, 2001 now U.S. Pat. No. 6,468,087 and entitled "Apparatus for Demonstrating a Skeletal Surgical Technique" which claims priority from U.S. Provisional Patent Application Ser. No. 60/179,354, filed on Jan. 31, 2000 and entitled "Apparatus for Demonstrating a Skeletal Surgical Technique".

BACKGROUND OF THE INVENTION

The present invention relates to an apparatus for modeling a skeletal structure before and after a surgical procedure is performed on the structure. More particularly, it relates to a tool that may be used to model the structure and mechanics of a skeletal joint both before and after an osteotomy is performed on a bone of the joint.

Many medical conditions involving the skeletal system may be remedied by the performance of an osteotomy technique, or the surgical division or sectioning of bone. As an example, a veterinary surgeon may perform a technique known as a tibial plateau leveling osteotomy to remedy problems caused by a weakened or ruptured cranial cruciate ligament in the leg of a dog. When the cranial cruciate ligament of a dog is damaged, the tibia may move forward relative to the femur when the leg is loaded. This forward motion, known as tibial thrust, may cause more severe injury to the dog's leg in the form of soft tissue (medial meniscus) impingement. The forward motion can occur because the tibial plateau, or the region of the proximal end of the tibia that contacts the femur, meets the femur at a non-perpendicular angle relative to the direction of the force the tibia exerts against the femur when the leg is loaded. The tibial plateau leveling osteotomy procedure is used to change the angle at which the tibial plateau contacts the femur to be more perpendicular to the direction of this force. In the procedure, a curvilinear cut is made in the proximal region of the tibia to free a portion of the tibia, including the tibial plateau region, from the rest of the bone. This portion may then be rotated along the curvilinear cut to change the angle at which the tibial plateau meets the femur. After the angle is changed to the desired angle, the bone portion is fixed to the rest of the tibia by conventional means.

Before performing an osteotomy procedure, a physician or veterinarian generally must explain the various aspects of the procedure to the patient or pet owner. For example, the doctor must explain the mechanics of the injured joint, and why the osteotomy is necessary to change the joint structure to fix the joint. The doctor must also explain how the osteotomy is performed, and why the joint will perform better after the surgery. Several methods may be used to convey this information to the patient. First, the doctor may simply talk to the patient. However, many people lack the physiological knowledge or training necessary to understand a discussion of bone mechanics and surgeries, even if the doctor describes the procedure in lay terms. Furthermore, a doctor often needs to use a relatively large quantity of unwieldy language to explain even simple procedures. Thus, a doctor who verbally describes a procedure runs the risk that a patient or pet owner will not understand all aspects of the procedure.

A doctor may also use some sort of visual aid to show the patient or pet owner how the procedure is to be performed. For example, a doctor may make or use two-dimensional illustrations of the joint before and after the surgery is performed to illustrate the procedure. Verbal descriptions combined with illustrations are superior to verbal descriptions alone for several reasons. First, a doctor may convey with a single illustration a complex idea that may be difficult to describe verbally. Also, the doctor may point to the illustration while describing a particular aspect of the joint or surgery to show the patient exactly what is being discussed. If the doctor wants to describe changes in the structure or performance of the joint caused by the surgery, the doctor may use separate illustrations to show the joint structure and mechanics before and after each step in the surgery. Though this method may make the description of the surgery somewhat easier for the patient to understand, it still presents difficulties. Most significantly, it is difficult to represent movement with illustrations. Separate illustrations may show the position of a bone before and after a movement, but the illustrations themselves do not represent the actual movement of the bone between the two positions. Thus, even with the use of two-dimensional illustrations, it remains difficult to explain in a simple manner exactly how the changes in bone structure alter the joint mechanics.

Rather than using two-dimensional illustrations to explain a surgical procedure, a doctor may also use a lifelike, three-dimensional skeletal model as a visual aid. Such models allow the motion of the joint to be demonstrated. However, due to the complexity of bone shapes and joint structures, a lay person may not be able to see subtle features in skeletal structure in these models. As an example, a lay person may have difficulty perceiving the angle at which the tibia meets the femur in a canine knee joint if shown a three-dimensional skeletal model of the joint. Also, these models may be fragile and difficult to transport. Thus, it would be desirable to have a simple apparatus or tool for illustrating the movement of a bone fragment during an osteotomy procedure, and for modeling the mechanics of a joint involved in the procedure both before and after the procedure.

SUMMARY OF THE INVENTION

One aspect of the present invention provides an apparatus for modeling a skeletal structure before and after a surgical procedure is performed on the structure. The apparatus comprises a base, the base including a generally planar surface, at least one bone member coupled to the base, the bone member representing a bone involved in the surgical procedure, and at least one bone portion movably coupled to the bone member, the bone portion representing a part of the bone involved in the surgical procedure that is repositioned in the surgical procedure from a preoperative position to a postoperative position. The bone portion may be selectively moved between a preoperative position, representing the position of the part of the bone before the surgical procedure is performed, and a postoperative position representing the position of the part of the bone after the surgical procedure is performed.

Another aspect of the present invention provides a tool for representing the mechanics of a skeletal joint before and after an osteotomy is performed on a bone of the joint. The tool comprises a base, the base including a generally planar surface, a first bone member coupled to the base substantially parallel to the base, the first bone member representing a first bone involved in the surgical procedure, and a second bone member movably coupled to the base substantially parallel to the base. The second bone member has opposing ends and represents a second bone involved in the surgical procedure. The second bone member is coupled to the first bone member such that one end of the second bone member is in movable contact with the first bone member to simulate the skeletal joint. The tool also includes a bone portion interposed between the first and second bone members, the bone portion representing a portion of one of the first and second bone members that is repositioned in the surgical procedure. The bone portion is movably coupled to one of the first and second bone members such that the bone portion may be selectively moved between a preoperative position, representing the position of the portion before the surgical procedure is performed, and a postoperative position, representing the position of the portion after the surgical procedure is performed. Movement of the joint before the performance of the surgical procedure may be represented by placing the bone portion in the preoperative position and moving the second bone member with respect to the base, and movement of the joint after the performance of the surgical procedure may be represented by placing the bone portion in the postoperative position and moving the second bone member with respect to the base.

Yet another aspect of the present invention provides a model for demonstrating tibial thrust in a canine knee joint before and after a tibial plateau leveling osteotomy procedure. The model comprises a base, including a generally planar surface, a femur member coupled to base, a foot member including an ankle portion and a heel portion, the foot member movably coupled to base at the heel portion, and a tibia member having opposing ends, the tibia member including a tibial plateau portion movably coupled to tibia member at one end of the tibia member. The tibia member extends between the foot member and the femur member such that the tibia member contacts the femur member at the tibial plateau portion to simulate a knee joint, and the tibia member is pivotally coupled to the ankle portion of the foot member at the other end to simulate an ankle joint. The tibial plateau portion may be moved between at least one preoperative position, wherein the angle of the tibial plateau portion relative to the femur member permits the tibial plateau portion to move in a forward direction relative to the femur member when the foot member is urged toward the tibia member, and at least one postoperative position, wherein the angle of the tibial plateau portion relative to the femur member prevents the tibial plateau portion from moving relative to the femur member when the foot member is urged toward the tibia member.

DETAILED DESCRIPTION OF THE PREFERRED EMBODIMENTS

The present invention provides an apparatus for clearly and simply illustrating modifications made in a bone structure during an osteotomy. The tool also permits the demonstration of the differences in bone or joint mechanics between the preoperative bone structure and the postoperative bone structure. One embodiment of the present invention is shown in FIGS. 1–6 generally at 10 as a tool for modeling a canine knee joint before and after a tibial plateau leveling osteotomy. Tool 10 includes a base 12 with a generally planar surface 13. A title or legend 14 describing the illustrated surgical technique may be included on surface 13 of base 12. The apparatus also includes at least one bone member for representing a bone involved in the osteotomy. Tool 10 of the exemplary embodiment includes three bone members, each representing a structure in the rear canine leg. A first bone member 16 represents a femur, a second bone member 18 represents a tibia, and a third bone member 20 represents all of the bones of a canine foot. First bone member 16, second bone member 18 and third bone member 20 are formed as two-dimensional cross-sectional representations of the bones to simplify the structure of the bones and joint for a lay observer. As will be explained below, first bone member 16, second bone member 18 and third bone member 20 are pivotally coupled to one another, allowing a veterinarian to move the bone members relative to one another to illustrate the movement of the joint. While the exemplary embodiment 10 illustrates a canine knee joint and a tibial plateau leveling osteotomy, the present invention may be used to model any bone, joint, or skeletal or connective tissue surgery desired.

Base 12 of tool 10 performs several functions. First, base 12 provides a surface for mounting first, second and third bone members 16, 18 and 20 so that each bone member 16, 18 and 20 is held in the correct position relative to one another. Base 12 also provides support for first, second and third bone members 16, 18 and 20 so they may be moved relative to one another, and helps prevent damage to first, second and third bone members 16, 18 and 20 during use or transport. Though base 12 may be made of any desired material, it is preferable to make base 12 from a stiff, relatively lightweight material to provide a sturdy backing for first, second and third bone members 16, 18 and 20, and to make tool 10 easier to transport. Suitable materials for base 12 include metals such as aluminum or stainless steel, and extruded and molded plastics. Base 12 may be made to any desired shape or size. For example, if tool 10 is to be used in demonstrating a surgical procedure to a large number of people at once, base 12 may be quite large, and the other components of tool 10 may be sized proportionally. In a preferred embodiment, however, tool 10 small enough and shaped regularly enough to be easily carried. For example, base 12 of tool 10 may have a length 1 of about 11 inches and a width of about 8½ inches. Base 12 may also have any desired depth d, but depth d is preferably relatively small, typically around 1/16 inch, to reduce the weight and expense of base 12.

First bone member 16 may be either movably or rigidly coupled to base 12, depending on the bones and surgical procedures represented. In the exemplary embodiment, first bone member 16 represents a canine femur. Because the tool models the motion of the tibia relative to the femur in the canine knee joint, first bone member 16 is rigidly coupled to base 12 so that second bone member 18, representing the tibia, may be moved relative to first bone member 16. First bone member is typically constructed of a thin, relatively stiff material such as sheet aluminum or steel, or an extruded or molded plastic, and may be coupled to base 12 with any suitable fastener, such as with screws 22. First bone member 16 includes a distal end 24, representing the distal end of a femur. The two-dimensional shape of first bone member 16 greatly simplifies the appearance of the bone and the joint to a lay observer. While first bone member 16 represents a femur in the exemplary embodiment, first bone member 16 may represent any other bone desired to model a particular joint or surgical technique.

Similar to first bone member 16, second bone member 18 may also be either rigidly or movably coupled to base 12. In the illustrated embodiment, second bone member 18 represents a canine tibia, and is movably coupled to base 12 so that second bone member 18 may move relative to first bone member 16. Second bone member 18 is not directly coupled to base 12 in this embodiment, but is pivotally coupled to third bone member 20, which in turn is directly coupled to the base. Second bone member 18 includes a proximal end 26 that represents the proximal end of a tibia. As with first bone member 16, second bone member 18 may be made to any desired size to suit a particular purpose, and has a simple two-dimensional shape to represent the bone and joint structure in a simple fashion to a lay observer.

Second bone member is coupled to a bone portion 28. Bone portion 28 represents the part of a bone that is repositioned during an osteotomy technique. Here, bone portion 28 represents a part of the proximal end of the tibia, and includes a tibial plateau 30, or the portion of the tibia that is in contact with the femur. Bone portion 28 includes a plurality of positioning holes 32. Each positioning hole 32 allows bone portion 28 to be fixed in a set position relative to second bone member 18. In the exemplary embodiment, three positioning holes 32a, 32b and 32c are shown. A curved joint 33, representing the shape of the cut with which the bone fragment is removed in the actual surgical technique, exists between bone portion 28 and second bone member 18. The curvature of curved joint 33 is uniform so that bone portion 28 may be rotated smoothly between positions. Bone portion 28 may then be fixed in a desired position by fixing it to a coupling member 34, which is mounted to second bone member 18 and extends over bone portion 28. Coupling member 34 includes a pin 36 and a hole 38, and is attached to second bone member 18 by any suitable fastener, such as by screws 40. To fix bone portion 28 relative to second bone member 18, bone portion 28 is first rotated to the desired position. Next, hole 38 in coupling member 34 is positioned directly above the corresponding positioning hole 32a, 32b or 32c in bone portion 28, and pin 36 is inserted through hole 36 and into positioning hole 32a, 32b, or 32c. Positioning holes 32a and 32b represent preoperative bone configuration, and positioning hole 32c represents a postoperative bone configuration. The purposes of the various bone configurations for illustrating the joint mechanics and surgical methods are explained in more detail below. Though coupling member 34 may be made to any desired shape and from any desired material, coupling member 34 preferably has the same general shape and is constructed from the same material as the actual brace that is used in the actual surgery. This allows a veterinarian or physician to more accurately depict the procedure to a pet owner or patient.

Second bone member 18 also includes a distal end 42 that contacts third bone member 20. Third bone member 20 collectively represents the bones of the canine foot, and includes a heel portion 44 and an ankle portion 46. Heel portion 44 is attached to base 12 at a pivot point 48 with a fastener such as a screw. Pivot point 48 represents the point at which the Achilles' tendon attaches to the heel, and serves as the point about which third bone member 20 pivots with respect to the base. Ankle portion 46 is shaped to form an ankle joint with the distal end 42 of second bone member 18. The shape of the ankle joint allows second bone member 18 to pivot with respect to third bone member 20 when third bone member is pivoted with respect to base 12. Second bone member 18 is coupled to third bone member 20 with a suitable coupling device, such as a bracket 50. Bracket 50 is mounted to second bone member 18 with suitable fasteners, such as screws 52, and to third bone member 20 with another fastener, such as screw 51. To permit second bone member 18 to pivot with respect to third bone member 20, bracket 50 is attached to ankle portion 46 of third bone member 20 with only a single screw 52. This allows second bone member 18 to pivot with respect to third bone member 20 about screw 51.

Third bone member 20 also includes a pad portion 53. Pad portion is shaped to resemble a canine foot to provide a recognizable reference point from which a lay observer can identify the rest of the components of tool 10. Third bone member 20 may be pivoted into a flexed position by moving pad portion 53 in the plane of surface 13 toward second bone member 18, simulating the loading of a canine leg. Similarly, third bone member 20 may be pivoted into an extended position by moving pad portion 53 away from second bone member 18, simulating the unloading of the canine leg. Stopping members 54 and 56 may be mounted to base 12 in the pivot path of third bone member 20 to restrict the length of travel of third bone member 20. An additional stopping member 58 may be included to prevent second bone member 18 from pivoting out of alignment with first bone member 16. Furthermore, a spring 60 may be attached to second bone member 18 to urge second bone member 18 and third bone member 20 into either the extended or flexed position. The spring 60 may be anchored to base 12 with a suitable fastener, such as a screw 62.

Figure 1:
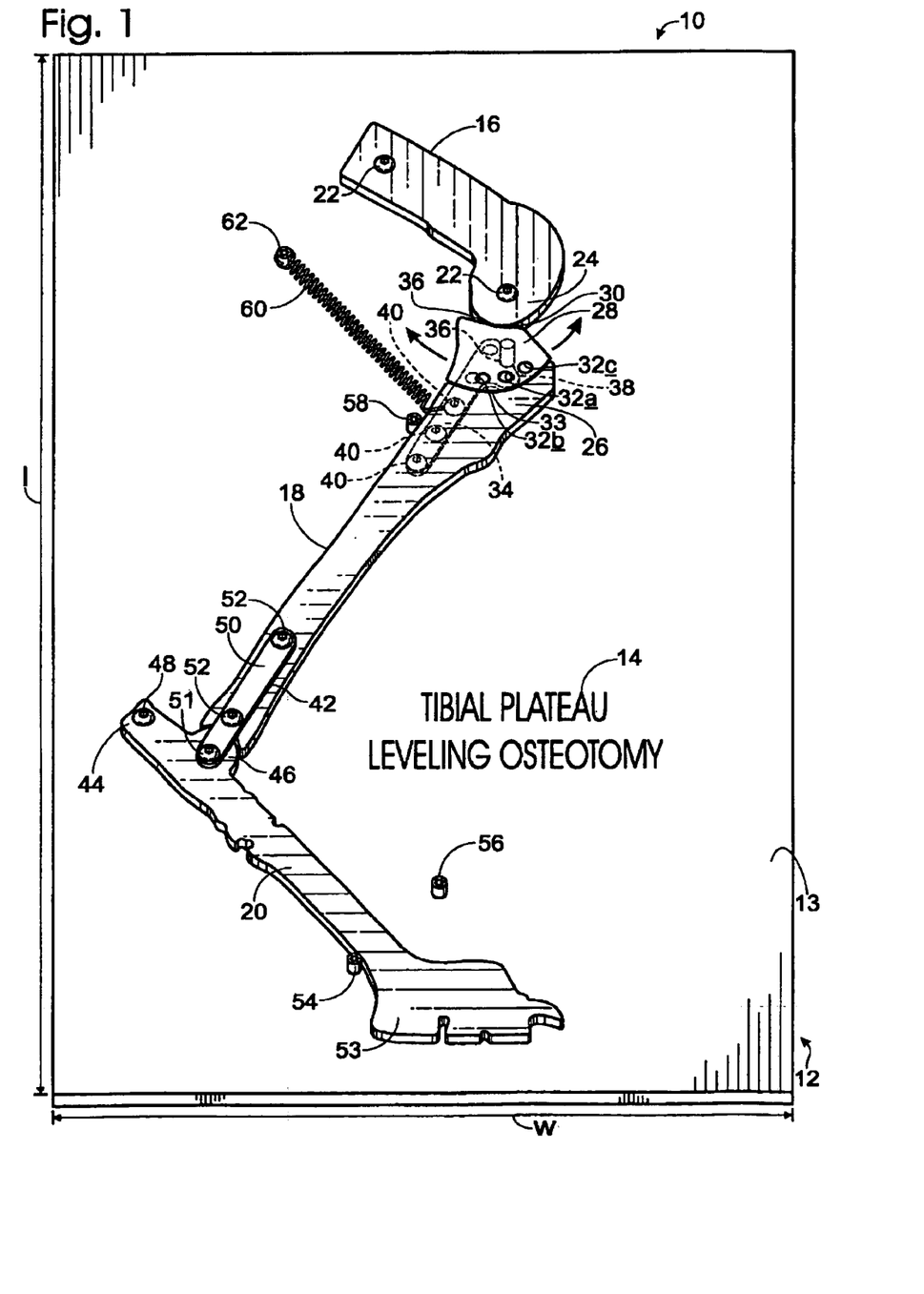
FIG. 1 is a front isometric view of an apparatus according to a first embodiment of the present invention.
Figure 2:
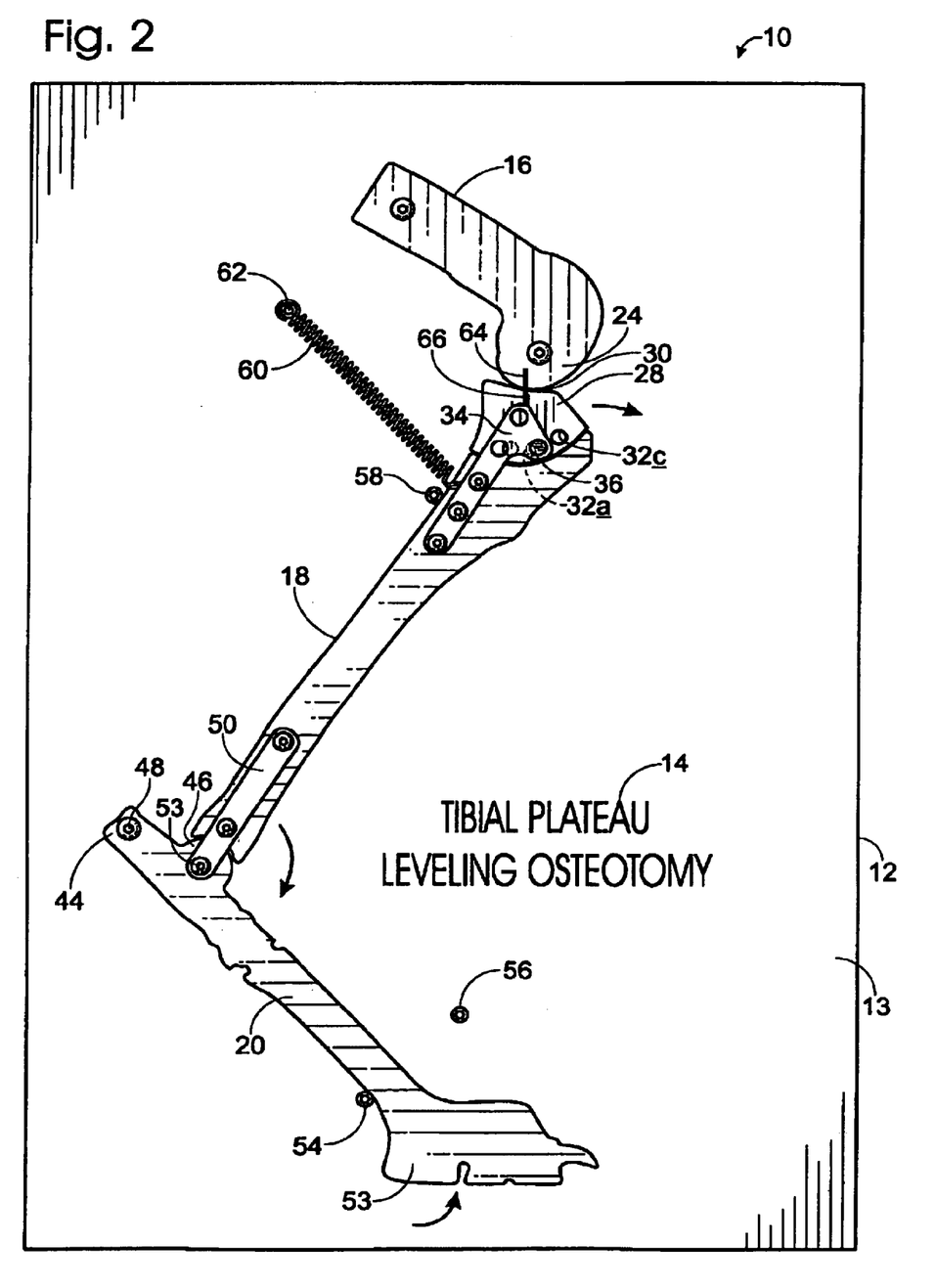
FIG. 2 is a top view of the embodiment of FIG. 1, with the bone portion in a first preoperative position, and the foot member and tibia member in an extended position.
Figure 3:
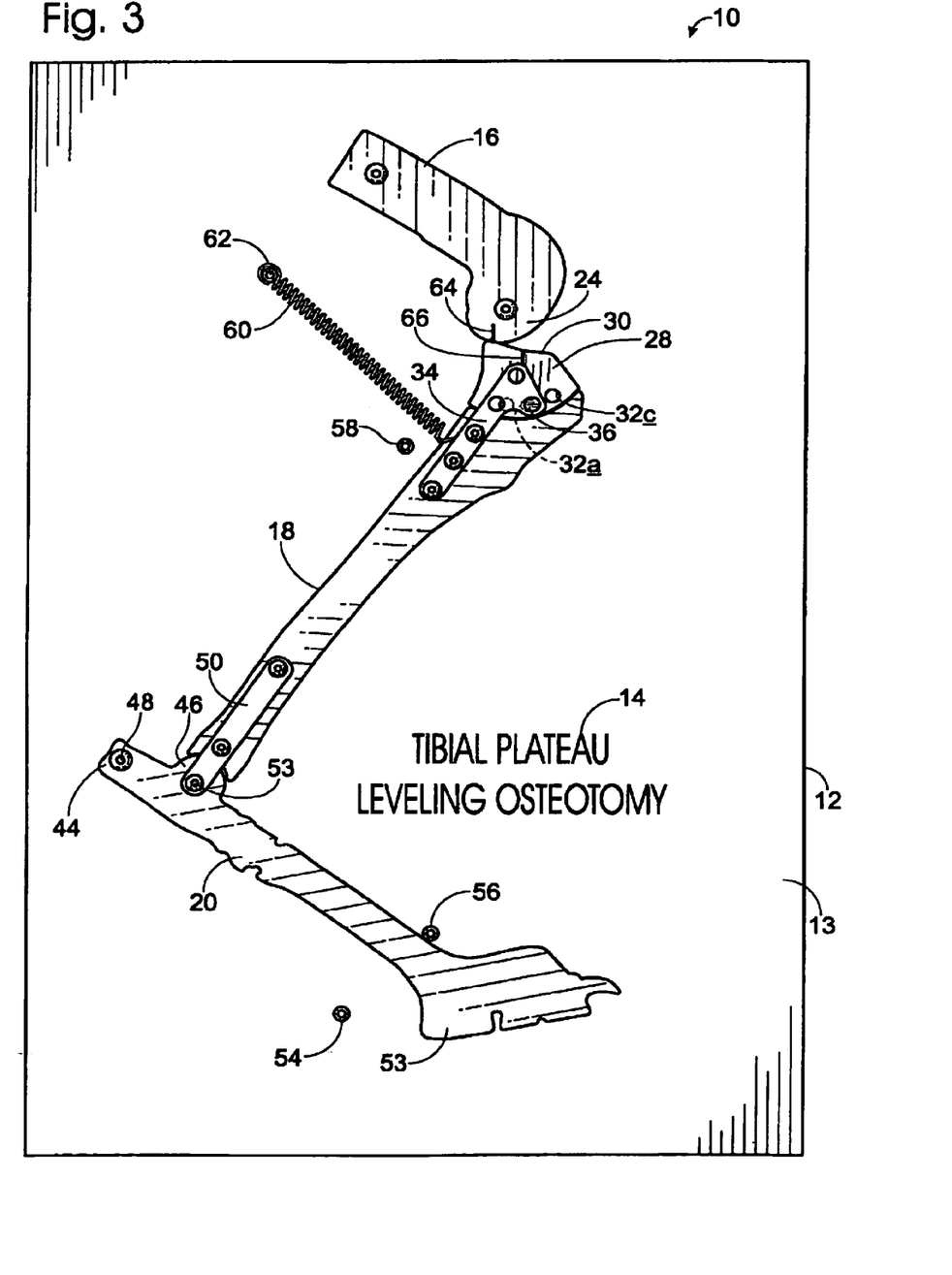
FIG. 3 is a top view of the embodiment of FIG. 1, with the bone portion in the first preoperative position, and the foot member and tibia member in a flexed position.

FIGS. 2 and 3 illustrate how tool 10 may be used to demonstrate the mechanics of a skeletal joint before corrective surgery is performed on the joint. In the following descriptions, the terms "femur member 16", "tibia member 18" and "foot member 20" are used in place of "first bone member 16", "second bone member 18" and "third bone member 20." In FIGS. 2–3, bone portion 28 is connected to tibia member 18 at hole 32a. This position represents the normal orientation of the plateau region of a canine tibia. Reference mark 64 on femur member 16 and reference mark 66 on bone portion 28 have been included to illustrate the position of bone portion 28 relative to tibia member 16. In FIG. 2, reference marks 64 and 66 meet end to end across curved joint 33 when foot member 20 is in the extended position. To simulate the forward movement of the tibia against the femur when the leg is loaded, pad portion 53 of foot member 20 may be moved into the flexed position toward tibia member 18 until foot member 20 contacts stopping member 56, as shown in FIG. 3. Moving foot member 20 causes it to pivot about point 48 relative to base 12, pushing tibia member 18 toward femur member 16. Because tibial plateau 30 is not perpendicular to the direction of the force exerted by tibia member 18 against femur member 16, tibia member 18 slides forward out of alignment with femur member 16. In FIG. 3, reference mark 66 on tibia member 18 can be seen to have moved forward with respect to reference mark 64 on femur member 16, illustrating the shift in position of bone portion 28 relative to femur member 16. Thus, a lay person who is shown this demonstration can actually watch how the tibia moves forward against the femur, helping the person to understand the mechanics of an injured joint.

Figure 4:
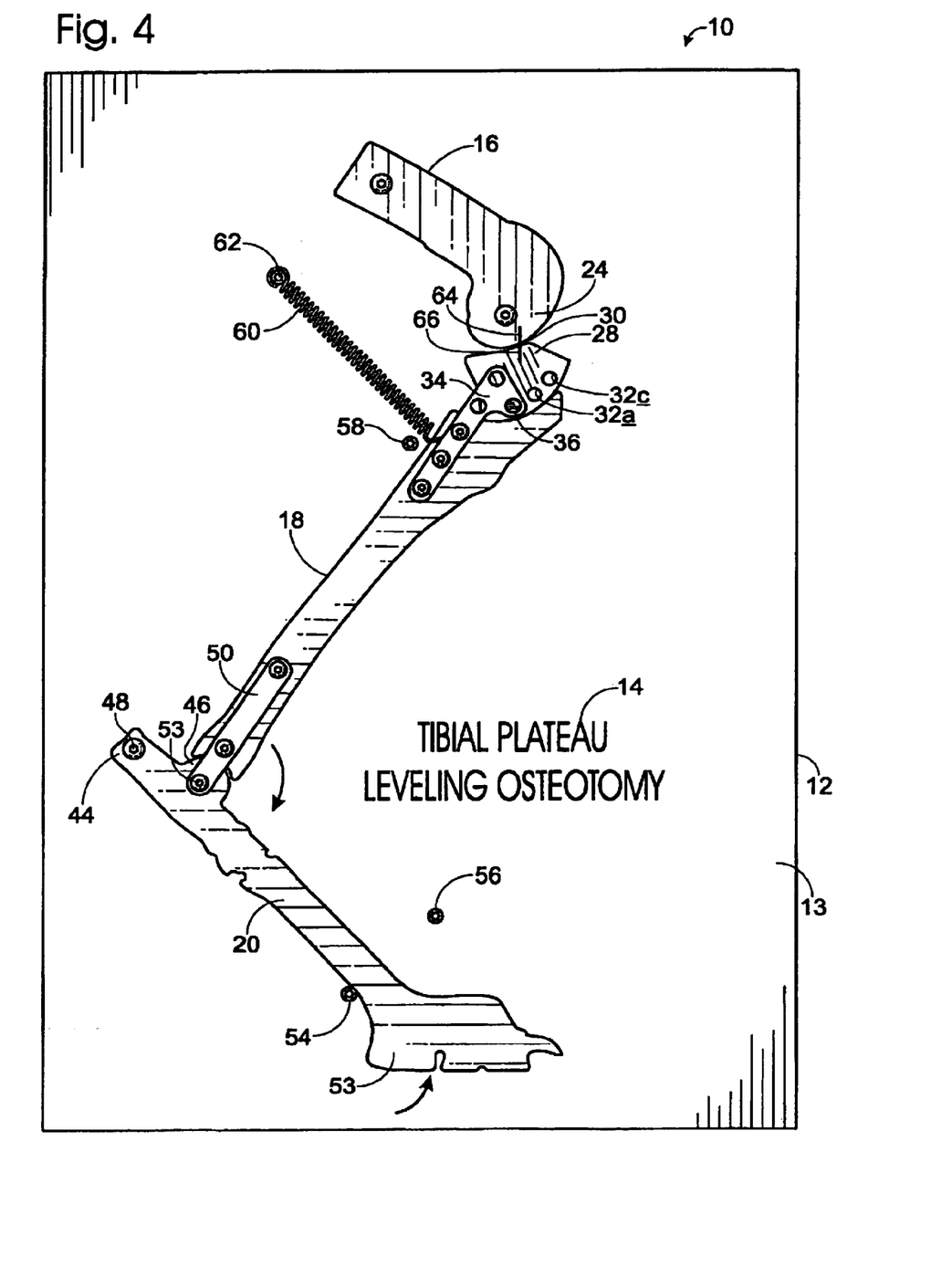
FIG. 4 is a top view of the embodiment of FIG. 1, with the bone portion in a second preoperative position, and the foot member and tibia member in the extended position.
Figure 5:
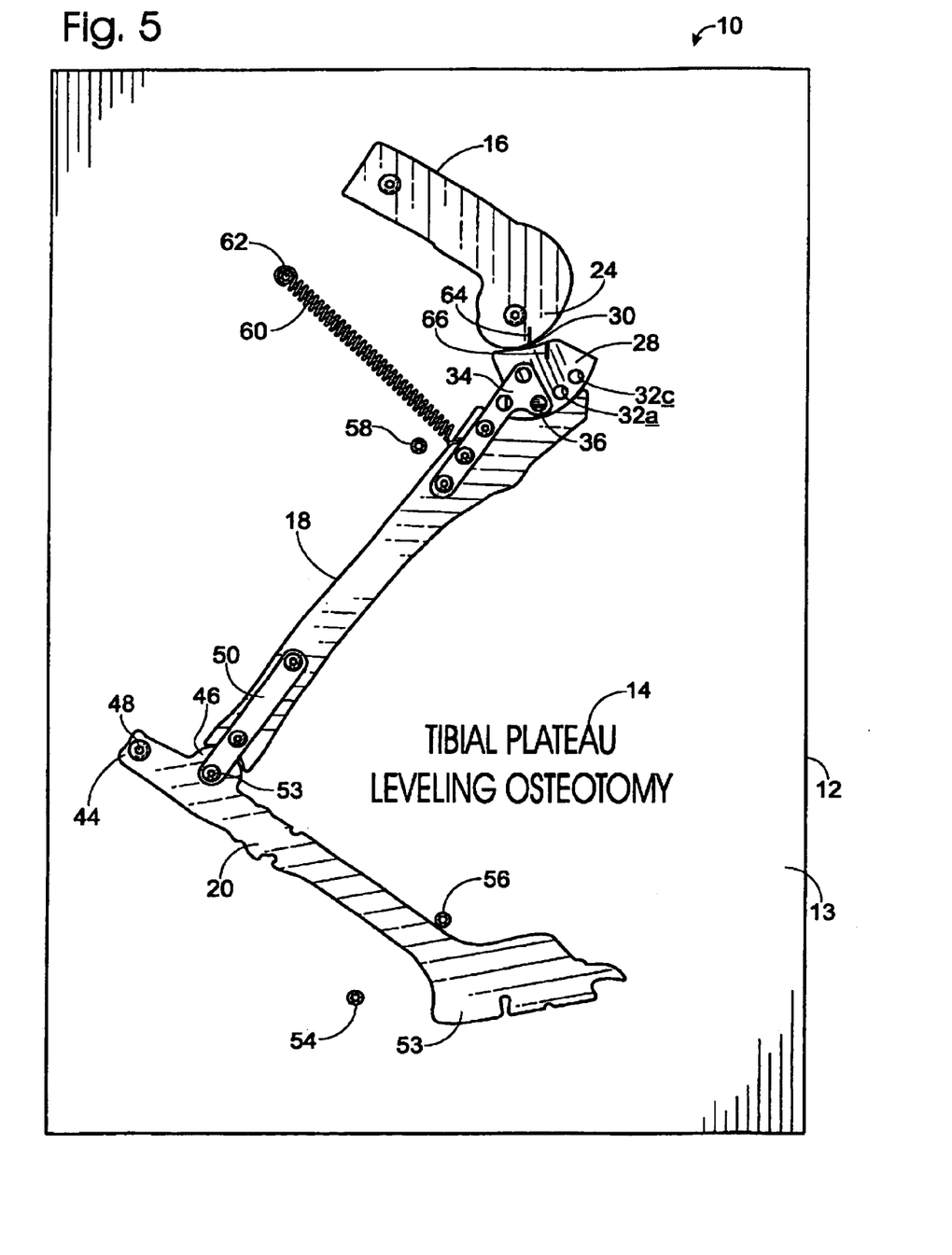
FIG. 5 is a top view of the embodiment of FIG. 1, with the bone portion in the second preoperative position, and the foot member and tibia member in the flexed position.
Figure 6:
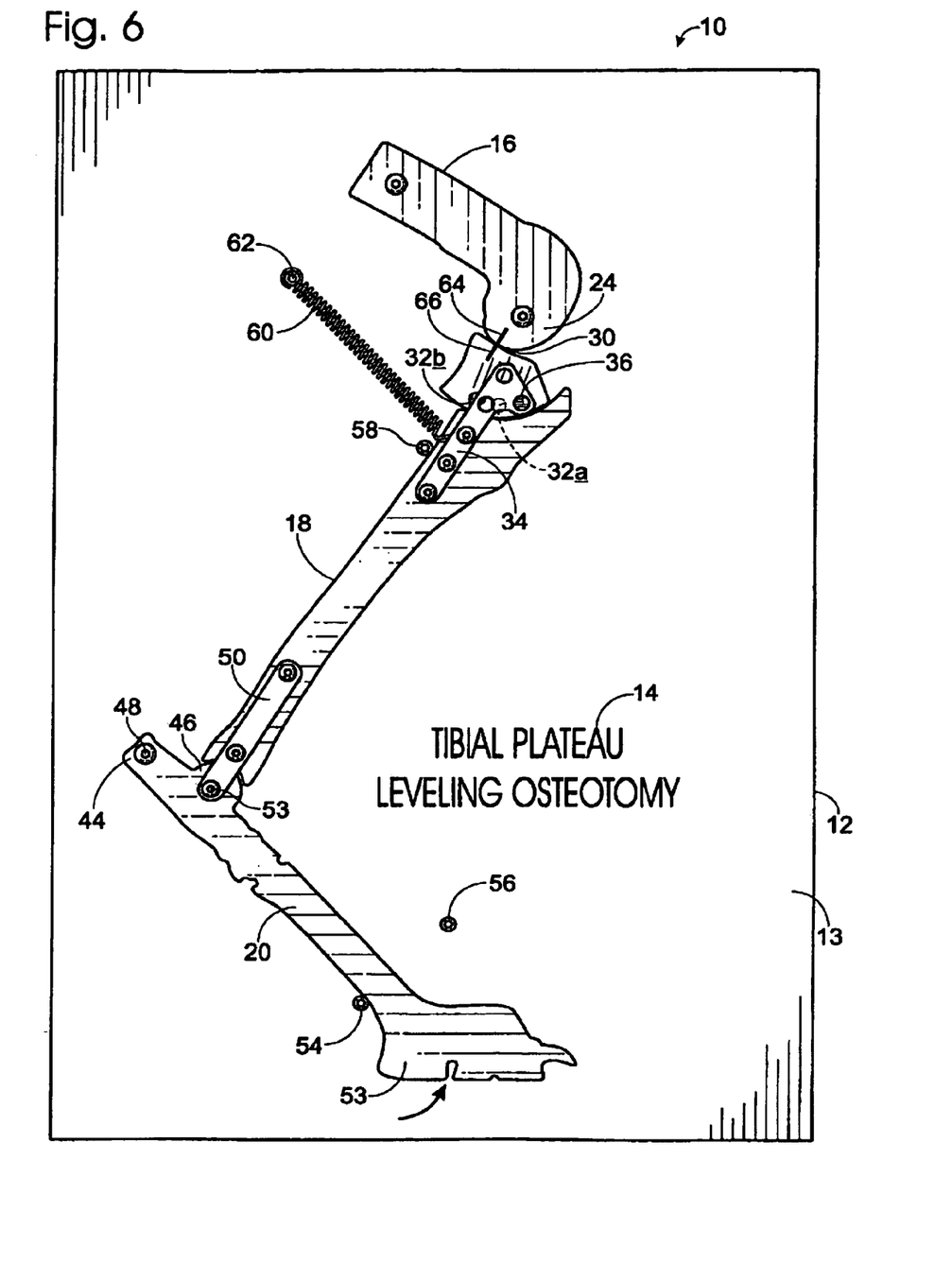
FIG. 6 is a top view of the embodiment of FIG. 1, with the bone portion in a postoperative position, and the foot member and tibia member in the extended position.

Tool 10 may also be used to demonstrate more severe joint problems. In FIGS. 4–5, bone portion 28 is connected to tibia member 18 at positioning hole 32b, representing a second possible preoperative bone structure with a more severe tibial plateau problem. When bone portion 28 is in this position, it meet tibia member 16 at an angle further from perpendicular with respect to the direction of the force exerted by tibia member 18 against femur member 16 than when bone portion 28 is attached to tibia member 18 at positioning hole 32a. In FIG. 4, reference marks 64 and 66 meet end to end across curved joint 33 when foot member 20 is in the extended position. Moving pad portion 53 of foot member 20 toward stopping member 56 causes tibia member 18 to push against femur member 16. Because the angle at which tibia member 18 meets femur member 16 is further from perpendicular relative to the direction of force along tibia member 16 than in the example of FIGS. 2–3, the tendency for tibia member 18 to slide forward relative to femur member 16 is increased. In FIG. 5, reference mark 66 is positioned significantly forward relative to reference mark 64 on femur member 16, demonstrating the shift in bone position caused by moving foot member 20.

Tool 10 may also be used to demonstrate how the bone structure may be changed to remedy a problem. First, the model may be used to show a pet owner how a bone fragment in the actual tibial plateau leveling osteotomy procedure is repositioned relative to the tibia. Rotating bone portion 28 along curved joint 33 from either preoperative position at positioning holes 32a and 32b to the postoperative position at positioning hole 32c simulates the repositioning of a bone fragment during surgery. Next, tool 10 may be used to demonstrate how the procedure corrects the tibial thrust problem. With bone portion fixed at positioning hole 32c, the angle at which tibial plateau 30 meets femur member 16 is approximately perpendicular to the direction of force along tibia member 18 created by urging foot member 20 toward tibia member 18. Thus, when foot member 20 is urged toward tibia member 18, tibia member 18 does not slide forward relative to femur member 16. Thus, foot member 20 cannot be moved toward tibia member 18, because tibia member 18 cannot move against femur member 16. Having a pet owner try to move foot member 20 with bone portion 28 in this position will clearly illustrate to the pet owner how the surgery corrects the problem with the joint.

Thus, through the use of a tool according to the present invention, a doctor or veterinarian can clearly and simply illustrate both how the structure of a bone is changed during an osteotomy, and how the bone structure is improved by the procedure. While the described embodiment illustrates a multiple bone system, the invention can be used to illustrate more or fewer bones, or even a single bone that is restructured through an osteotomy. Furthermore, while the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicants' invention.

I claim:

1. An apparatus for modeling a skeletal structure before and after a surgical procedure is performed on the structure, the apparatus comprising:

a base, the base including a generally planar surface;

a first bone member coupled to the base, the first bone member representing a bone involved in the surgical procedure, and the first bone member being coupled to the base generally parallel to the surface of the base;

a second bone member coupled to the first bone member to simulate a skeletal joint, the second bone member being movably coupled to the first bone member so that the second bone member may be moved between an extended position and a flexed position relative to the first bone member, and the second bone member being movably coupled to the base and adapted to move generally parallel to the surface of the base;

at least one bone portion movably coupled to the bone member, the bone portion representing a part of the bone involved in the surgical procedure that is repositioned in the surgical procedure from a preoperative position to a postoperative position;

wherein the bone portion may be selectively moved between a preoperative position, representing the position of the part of the bone before the surgical procedure is performed, and a postoperative position representing the position of the part of the bone after the surgical procedure is performed; and at least one stopping member coupled to the base, wherein the stopping member is adapted to stop the second bone member from being moved past a predetermined location on the base.

* * * * *